US011269878B2

(12) United States Patent
Li

(10) Patent No.: US 11,269,878 B2
(45) Date of Patent: Mar. 8, 2022

(54) UNCORRELATED SUBQUERY OPTIMIZATION METHOD AND APPARATUS, AND STORAGE MEDIUM

(71) Applicant: Tencent Technology (Shenzhen) Company Limited, Shenzhen (CN)

(72) Inventor: Haixiang Li, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 70 days.

(21) Appl. No.: 16/521,895

(22) Filed: Jul. 25, 2019

(65) Prior Publication Data

US 2019/0347260 A1 Nov. 14, 2019

Related U.S. Application Data

(63) Continuation of application No. PCT/CN2018/090610, filed on Jun. 11, 2018.

(30) Foreign Application Priority Data

Jun. 14, 2017 (CN) .......................... 201710447344.0

(51) Int. Cl.
*G06F 16/24* (2019.01)
*G06F 16/2453* (2019.01)

(52) U.S. Cl.
CPC .. *G06F 16/24535* (2019.01); *G06F 16/24537* (2019.01); *G06F 16/24549* (2019.01)

(58) Field of Classification Search
CPC ................................................. G06F 16/24535
(Continued)

(56) References Cited

U.S. PATENT DOCUMENTS 6,341,281 B1 * 1/2002 MacNicol ......... G06F 16/24539
7,376,646 B2 5/2008 Beavin et al.
(Continued)

FOREIGN PATENT DOCUMENTS

CN 103678621 A 3/2014
CN 103714058 A 4/2014
(Continued)

OTHER PUBLICATIONS

Chinese Office Action and concise translation regarding 2017104473440 dated Jan. 29, 2021, 7 pages.
(Continued)

*Primary Examiner* — Syling Yen
(74) *Attorney, Agent, or Firm* — Crowell & Moring LLP

(57) ABSTRACT

The embodiments of this application provide an uncorrelated subquery optimization method and apparatus, and a storage medium. The method includes determining whether there is an uncorrelated subquery statement in a target clause in a database query statement. In response to the determination that there is the uncorrelated subquery statement in the target clause in the database query statement, the method includes obtaining an estimated number of rows of an execution result set corresponding to the target clause; and determining whether the estimated number of rows is less than a preset threshold. In response to the determination that the estimated number of rows is less than a preset threshold, the method includes executing the uncorrelated subquery statement, and rewriting the target clause according to an execution result set of the uncorrelated subquery statement, to eliminate the uncorrelated subquery statement.

17 Claims, 9 Drawing Sheets

(58) Field of Classification Search
USPC .......................................................... 707/713
See application file for complete search history.

(56) References Cited

U.S. PATENT DOCUMENTS

| | | | |
|---|---|---|---|
| 9,183,254 | B1 | 11/2015 | Cole et al. |
| 10,642,832 | B1* | 5/2020 | Neumann ......... G06F 16/24535 |
| 2014/0379690 | A1 | 12/2014 | Ahmed et al. |
| 2016/0378827 | A1* | 12/2016 | Bondalapati ...... G06F 16/24556 |
| | | | 707/718 |

FOREIGN PATENT DOCUMENTS

| | | |
|---|---|---|
| CN | 103729392 A | 4/2014 |
| CN | 104123288 A | 10/2014 |
| CN | 104714973 A | 6/2015 |
| CN | 104765731 A | 7/2015 |
| CN | 107315790 A | 11/2017 |

OTHER PUBLICATIONS

International Search Report and concise translation for corresponding application PCT/CN2018/090610 filed on Jun. 11, 2018, dated Sep. 10, 2018, 9 pages.

\* cited by examiner

```
mysql> EXPLAIN EXTENDED
    -> SELECT ID FROM t1
    -> WHERE uk IN (SELECT k2_2 FROM t2 WHERE k2_2>2);
+----+-------------+-------+-------------------------------------------------------------------------+
| id | select_type | table | Extra                                                                   |
+----+-------------+-------+-------------------------------------------------------------------------+
|  1 | SIMPLE      | t1    | Using where                                                             |
|  1 | SIMPLE      | t2    | Using where; Using index; FirstMatch(t1); Using join buffer (Block Nested Loop) |
+----+-------------+-------+-------------------------------------------------------------------------+ mysql> SHOW WARNINGS;
...
/* select#1 */
select `d`.`t1`.`ID` AS `ID`
from `d`.`t1` semi join (`d`.`t2`)
where ((`d`.`t2`.`k2_2` = `d`.`t1`.`uk`) and (`d`.`t1`.`uk` > 2))
```

FIG. 1C

```
mysql> EXPLAIN EXTENDED
    -> SELECT ID FROM t1
    -> WHERE col IN (SELECT col FROM t2);
+----+-------------+------------+-------------------------------------------------+
| id | select_type | table      | Extra                                           |
+----+-------------+------------+-------------------------------------------------+
|  1 | SIMPLE      | <subquery2>| NULL                                            |
|  1 | SIMPLE      | t1         | Using where; Using join buffer (Block Nested Loop)|
|  2 | MATERIALIZED| t2         | NULL                                            |
+----+-------------+------------+-------------------------------------------------+
3 rows in set, 1 warning (0.01 sec)

mysql> SHOW WARNINGS;
...
/* select#1 */
select `d`.`t1`.`ID` AS `ID`
from `d`.`t1` semi join (`d`.`t2`)
where (`d`.`t1`.`col` = `<subquery2>`.`col`)
```

FIG. 1D

UNCORRELATED SUBQUERY OPTIMIZATION METHOD AND APPARATUS, AND STORAGE MEDIUM

RELATED APPLICATION

This application is a continuation application of PCT Patent Application No. PCT/CN2018/090610, filed on Jun. 11, 2018, which claims priority to Chinese Patent Application No. 201710447344.0, filed with the Patent Office of China on Jun. 14, 2017, both of which are incorporated herein by reference in their entireties.

FIELD OF THE TECHNOLOGY

The present disclosure relates to the field of computer technologies, and specifically to an uncorrelated subquery optimization method and apparatus, and a storage medium.

BACKGROUND OF THE DISCLOSURE

A data processing system such as a database system or a big data processing system usually takes supporting a structured query language (SQL) function as a main goal to achieve, to provide data operation convenience for users.

In an SQL processing process, an SQL engine needs to perform lexical parsing, syntax parsing, semantic analysis, logic optimization, and physical optimization on an SQL statement, and then hand over an obtained execution plan to an executor for execution. This process is divided into three phases: an analysis phase, an optimization phase, and an execution phase.

Subquery optimization occurs in the logic optimization phase, and is an optimization sub-phase (usually referred to as query rewriting) in the logic optimization phase. Generally, the subquery may be divided into two types: a correlated subquery and an uncorrelated subquery.

SUMMARY

The present disclosure provides an uncorrelated subquery optimization method and apparatus, and a storage medium, to improve the execution efficiency of a database query statement having an uncorrelated subquery.

An embodiment of this application provides a method for optimizing an uncorrelated subquery. The method includes determining, by a computer device comprising a memory storing instructions and a processor in communication with the memory, whether there is an uncorrelated subquery statement in a target clause in a database query statement. In response to the determination that there is the uncorrelated subquery statement in the target clause in the database query statement, the method includes obtaining, by the computer device, an estimated number of rows of an execution result set corresponding to the target clause; and determining, by the computer device, whether the estimated number of rows is less than a preset threshold. In response to the determination that the estimated number of rows is less than a preset threshold, the method includes executing, by the computer device, the uncorrelated subquery statement, and rewriting, by the computer device, the target clause according to an execution result set of the uncorrelated subquery statement, to eliminate the uncorrelated subquery statement.

An embodiment of this application further provides an apparatus for optimizing an uncorrelated subquery. The apparatus includes a memory storing instructions; and a processor in communication with the memory. When the processor executes the instructions, the processor is configured to cause the apparatus to determine whether there is an uncorrelated subquery statement in a target clause in a database query statement. In response to the determination that there is the uncorrelated subquery statement in the target clause in the database query statement, the processor is configured to cause the apparatus to obtain an estimated number of rows of an execution result set corresponding to the target clause; and determine whether the estimated number of rows is less than a preset threshold. In response to the determination that the estimated number of rows is less than a preset threshold, the processor is configured to cause the apparatus to execute the uncorrelated subquery statement when the estimated number of rows is less than a preset threshold, and rewrite the target clause according to an execution result set of the uncorrelated subquery statement, to eliminate the uncorrelated subquery statement.

An embodiment of this application provides a non-transitory computer readable storage medium storing instructions. The instructions, when executed by a processor, cause the processor to perform determining whether there is an uncorrelated subquery statement in a target clause in a database query statement. In response to the determination that there is the uncorrelated subquery statement in the target clause in the database query statement, the instructions, when executed by a processor, cause the processor to perform obtaining an estimated number of rows of an execution result set corresponding to the target clause; and determining whether the estimated number of rows is less than a preset threshold. In response to the determination that the estimated number of rows is less than a preset threshold, the instructions, when executed by a processor, cause the processor to perform executing the uncorrelated subquery statement, and rewriting the target clause according to an execution result set of the uncorrelated subquery statement, to eliminate the uncorrelated subquery statement.

BRIEF DESCRIPTION OF THE DRAWINGS

To describe the technical solutions of the embodiments of this application, the following introduces the accompanying drawings for describing the embodiments. Apparently, the accompanying drawings in the following description show only some embodiments of this application, and a person of ordinary skill in the art may still derive other drawings from these accompanying drawings without creative efforts.

FIG. 1C is a schematic diagram of a semi join optimization manner according to an embodiment of this application.

FIG. 1D is a schematic diagram of a materialized optimization manner according to an embodiment of this application.

DETAILED DESCRIPTION

The following clearly and completely describes the technical solutions in the embodiments of this application with reference to the accompanying drawings in the embodiments of this application. Apparently, the described embodiments are some of the embodiments of this application rather than all of the embodiments. All other embodiments obtained by a person skilled in the art based on the embodiments of this application without creative efforts shall fall within the protection scope of this application.

At present, a conventional optimization manner of an uncorrelated subquery mainly includes semi join optimization and "materialized" optimization. The semi join optimization is a subquery pull-up technology, and is an optimization form of eliminating a subquery by using semi join semantics, and belongs to a logic optimization sub-phase. The materialized optimization is to identify an uncorrelated subquery clause as "capable of being materialized", and perform once in an execution phase, and then buffer a result for subsequent use.

However, if a database query statement (such as an SQL statement) having an uncorrelated subquery is optimized by using the foregoing uncorrelated subquery optimization manner, when the optimized database query statement is executed in the execution phase, a subquery specified table (for example, using semi join optimization) needs to be accessed for a plurality of times, or a temporary table (for example, using materialized optimization) corresponding to the subquery specified table is accessed for a plurality of times. A relatively large amount of time is spent, and a large number of computing resources are also consumed. Consequently, the execution efficiency of the database query statement having the uncorrelated subquery is reduced, and this is more obvious when facing query of a large data volume.

In view of this, the embodiments of this application provide an uncorrelated subquery optimization method and apparatus, to improve the execution efficiency of a database query statement having an uncorrelated subquery. Detailed descriptions are provided below separately.

Figure 1A:
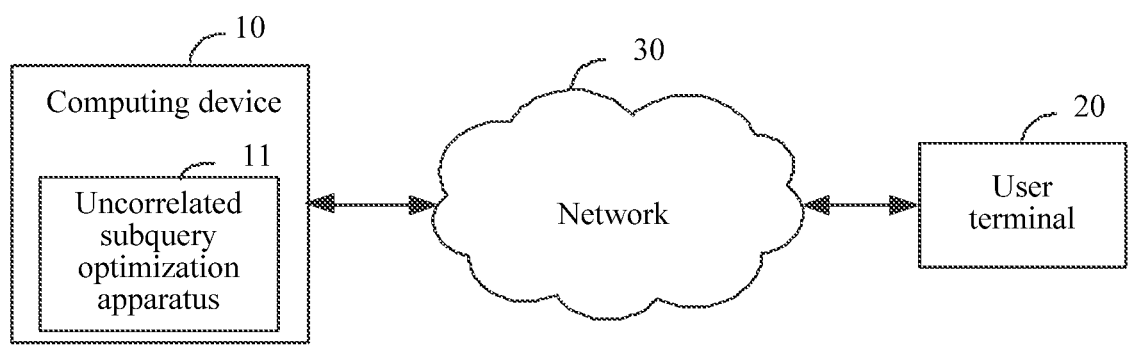
FIG. 1A is a schematic diagram of an implementation environment of an uncorrelated subquery optimization method according to an embodiment of this application.

FIG. 1A is a schematic diagram of an implementation environment of an uncorrelated subquery optimization method according to an embodiment of this application. A computing device 10 is integrated with an uncorrelated subquery optimization apparatus 11 according to any embodiment of this application, for implementing an uncorrelated subquery optimization method according to any embodiment of this application. The computer device 10 and a user terminal 20 are connected through a network 30, and the network 30 may be a wired network or a wireless network.

This embodiment will be described from the perspective of an uncorrelated subquery optimization apparatus. The uncorrelated subquery optimization apparatus may be specifically integrated in the computing device, for example, in a server, and the server may be a database server, or the like.

An embodiment of this application provides an uncorrelated subquery optimization method, including: determining whether there is an uncorrelated subquery statement in a target clause in a database query statement; if yes, obtaining an estimated number of rows of an execution result set corresponding to the target clause; executing the uncorrelated subquery statement to obtain an execution result set when the estimated number of rows is less than a preset threshold; and rewriting the target clause according to the execution result set, to eliminate the uncorrelated subquery statement.

Figure 1B:
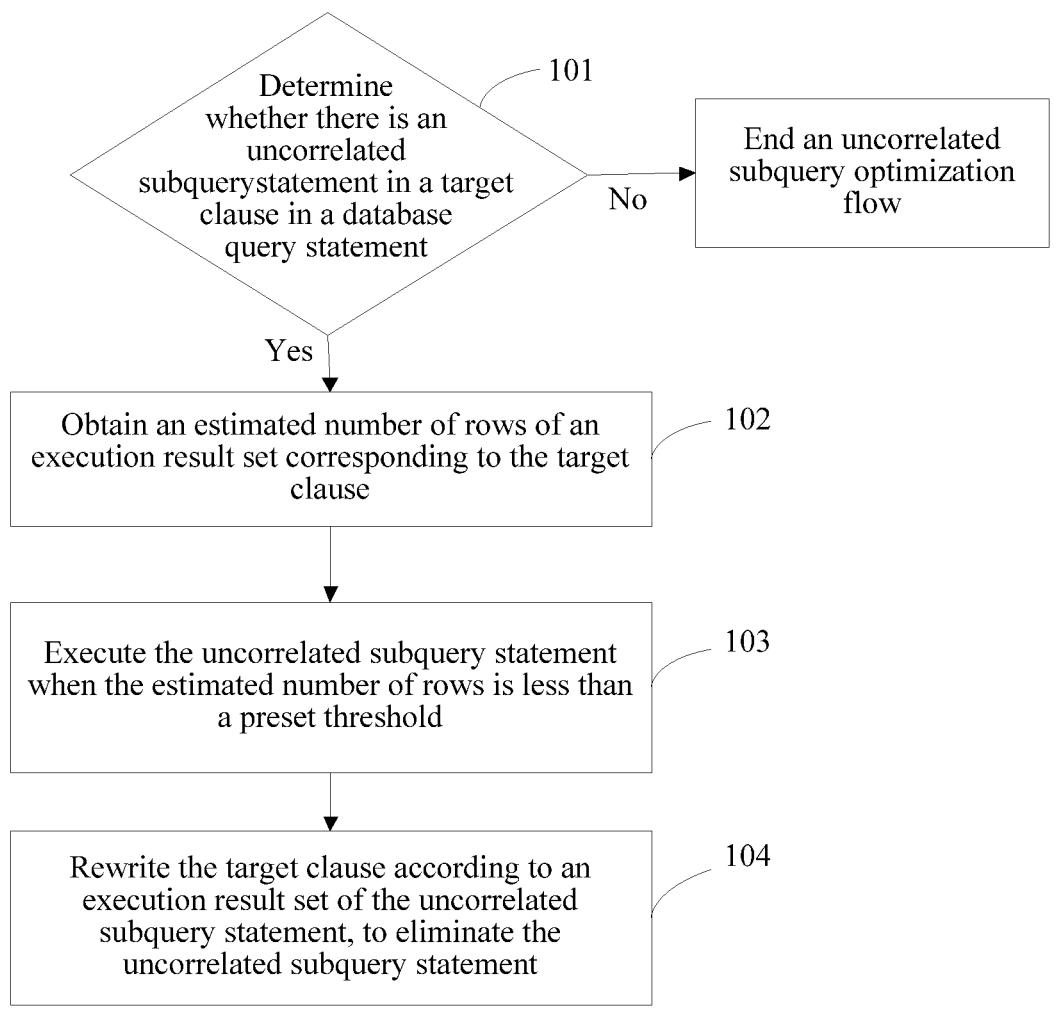
FIG. 1B is a schematic flowchart of an uncorrelated subquery optimization method according to an embodiment of this application.

As shown in FIG. 1B, a specific flow of the uncorrelated subquery optimization method may be as follows:

Step 101: Determine whether there is an uncorrelated subquery statement in a target clause in a database query statement, if yes, perform step 102, and otherwise, end an uncorrelated subquery optimization flow.

Specifically, whether there is an uncorrelated subquery statement in the target clause in the database query statement may be determined in a logic optimization phase of the database query statement.

The database query statement may be implemented by a plurality of languages, for example, a structured query language (SQL) or another type of language. The SQL may include a data query language (DQL), a data manipulation language (DML), and other languages. When the database query statement is implemented by the SQL, the database query statement is an SQL statement. When the database query statement is implemented by the DQL and the DML, the database query statement is a DQL statement and a DML statement.

In this embodiment, a subquery is nesting a query lower-layer program module in a common computer language such as a database query language. When a query is a subpart of another query, the query may be referred to as a subquery. The subquery is a query nested in a query, and this subquery may also be referred to as a nested query.

Generally, according to a relationship between a relationship object and an outer-layer relationship object involved in a subquery, the subquery may be divided into two types: a correlated subquery and an uncorrelated subquery.

The correlated subquery is a subquery whose execution depends on some attribute values of an outer-layer parent query. Because the correlated subquery depends on a parameter of the parent query, when the parameter of the parent query changes, the correlated subquery needs to be re-executed according to a new parameter value (a query optimizer has significance for optimizing the correlated subquery).

The uncorrelated subquery is a subquery that does not depend on any attribute value of the outer-layer parent query. Such a subquery has independence and can be separately solved, to form a subquery plan earlier than an outer-layer query solution.

In this embodiment, the uncorrelated subquery statement is usually nested in the target clause of the database query statement. The target clause may be a clause in which a subquery may occur, such as a conditional clause. When the database query statement is an SQL statement, the target clause may include:

a) a target column location: if the subquery is located in a target column, the subquery can only be a scalar subquery, and otherwise, a database may return a prompt similar to "error: a subquery must return only one field";

b) a FROM clause: when the correlated subquery occurs in the FROM clause, the database may return a prompt similar to "a subquery in a FROM clause cannot refer to a relationship in a same query level", and therefore the correlated subquery cannot occur in the FROM clause; when the uncorrelated subquery occurs in the FROM clause, the subquery may be pulled up to the parent layer, and join costs are uniformly considered during multi-table joining, and then prioritization is performed;

c) a conditional clause such as (a WHERE clause): a subquery that occurs in the WHERE clause is a part of a conditional expression, and the expression may be decomposed into an operator and an operand; according to different data types that participate in operation, the operators are not all the same, for example, the INT type has operations such as ">, <, =, and < >", and this has requirements for the subquery (for example, an equivalent operation of the INT type requires that the subquery needs to be a scalar subquery). In addition, for formats in which the subquery occurs in the WHERE clause, there are also operations specified by using predicates, such as IN, BETWEEN, and EXISTS;

d) a JOIN/ON clause: the JOIN/ON clause may be split into two parts: one is a JOIN block similar to the FROM clause, and the other is an ON clause block similar to the WHERE clause, and a subquery may occur in both the two parts. A processing manner of the subquery is the same as those of the FROM clause and the WHERE clause;

e) a GROUPBY clause: the target column needs to be associated with GROUPBY. The subquery may be written at a GROUPBY location, but there is no practical significance when the subquery is used at the GROUPBY location; and f) an ORDERBY clause: the subquery may be written at an ORDERBY location. However, an ORDERBY operation acts on an entire SQL statement, and there is no practical significance when the subquery is used at the ORDERBY location.

Step 102: Obtain an estimated number of rows of an execution result set corresponding to the target clause.

The execution result set corresponding to the target clause is a result set obtained by executing the target clause. The estimated number of rows is an estimated cardinality of an execution plan corresponding to the target clause, and may be an estimated number of rows that is returned from the data table result set or index.

Using an SQL statement as an example, it is assumed that the SQL statement is as follows (uk represents a unique key):

SELECT * FROM t1
WHERE uk IN (SELECT k2_2 FROM t2 WHERE k2_2>2);

in this case, the estimated number of rows of the result set corresponding to the WHERE conditional clause, namely, the result set queried from Table t2 may be executed.

The estimated number of rows of the execution result set corresponding to the target clause such as the conditional clause may be obtained based on the historical estimated number of rows and the selection rate of the table. Namely, the step "obtaining an estimated number of rows of an execution result set corresponding to the target clause" may include:

obtaining a historical estimated number of rows (denoted as rows) of a to-be-queried table corresponding to the target clause;

obtaining a corresponding selection rate (denoted as s) according to an expression of the target clause;

obtaining an estimated number of rows (denoted as w_rows) of the to-be-queried table corresponding to the target clause according to the historical estimated number of rows and the selection rate; and using the estimated number of rows of the to-be-queried table corresponding to the target clause as the estimated number of rows of the execution result set corresponding to the target clause.

For example, the estimated number of rows of the execution result set corresponding to the target clause may be calculated by using a formula w_rows=rows*s.

The historical estimated number of rows of the to-be-queried table is an estimated number of rows of the to-be-queried table before this moment, and usually, a data statistical module may be disposed in a query statement processing process to collect statistics on and record the estimated number of rows of the to-be-queried table, to form historical statistical data.

Therefore, in this embodiment, the estimated number of rows of the to-be-queried table corresponding to the target clause, that is, the historical estimated number of rows, may be obtained from the historical statistical data.

For example, in the foregoing described manner, in this embodiment, the estimated number of rows of the execution result set corresponding to the WHERE conditional clause may be calculated, and this process is the same as a conventional process of calculating the actual number of rows. For example, if there is no WHERE condition in the uncorrelated subquery clause, the selection rate is 1, namely, equivalent to w_rows is equal to rows.

Step 103: Execute the uncorrelated subquery statement when the estimated number of rows is less than a preset threshold.

In some embodiments of this application, when the estimated number of rows is relatively large, for example, exceeds the preset threshold, the optimization method provided in this embodiment of this application may not be used, and a conventional optimization manner is used.

The preset threshold (denoted as Kmax) is a sentinel value, which is a positive integer, and indicates the size of a result set of an uncorrelated subquery supported by the optimization method provided in this embodiment of this application. The preset threshold is a system/session parameter, and may be set according to actual requirements. In addition, the preset threshold may further be dynamically adjusted. For example, a default value of the preset threshold is 2000, and a maximum value is 20000 (may be defined by a user), or the like.

Step 104: Rewrite the target clause according to an execution result set of the uncorrelated subquery statement, to eliminate the uncorrelated subquery statement.

Specifically, when execution of the uncorrelated subquery statement is completed, the target clause may be rewritten according to the execution result set of the uncorrelated subquery statement.

In this embodiment, the manner of rewriting the target clause according to the execution result set includes: directly replacing the uncorrelated subquery statement in the expression of the target clause with an execution result to eliminate the uncorrelated subquery.

For example, using an SQL statement as an example, it is assumed that the SQL statement is as follows (uk represents a unique key):

SELECT * FROM t1
WHERE uk IN (SELECT k2_2 FROM t2 WHERE k2_2>2);

after the uncorrelated subquery "SELECT k2_2 FROM t2 WHERE k2_2>2" is executed, the obtained execution result is: {3,4}.

Then, the WHERE clause of the original SQL statement may be changed as:

WHEREukIN{3,4}.

In some embodiments of this application, the expression of the target clause such as the conditional clause may be further simplified, to improve the execution efficiency of the database query statement. For example, after the uncorrelated subquery statement in the expression of the target clause is replaced with the execution result, the replaced expression may further be accordingly simplified and deformed according to an operator in the target clause. Namely, the step "rewriting the target clause according to the execution result set" may include:

replacing the uncorrelated subquery statement in an expression of the target clause with the execution result set of the uncorrelated subquery statement; and performing corresponding deformation or transformation and optimization on the replaced expression according to an operator in the target clause.

For example, using an SQL statement as an example, it is assumed that the SQL statement is as follows (uk represents a unique key):

SELECT * FROM t1
WHERE uk IN (SELECT k2_2 FROM t2 WHERE k2_2>2);

after the uncorrelated subquery "SELECT k2_2 FROM t2 WHERE k2_2>2" is executed, the obtained execution result is: {3,4}.

Then, the WHERE clause of the original SQL statement may be changed as:

WHEREukIN{3,4}.

Because the operator is "IN", the WHERE clause of the original SQL statement may be deformed as:

WHEREuk=3 OR uk=4.

In this way, the original SQL statement may be deformed as:

SELECT * FROM t1
WHEREuk=3 OR uk=4.

By observing the foregoing SQL statement, an original query with a subquery becomes single table scanning, and the unique index on uk may be used to perform index scanning twice to obtain a query result. Therefore, time complexity of the entire SQL statement becomes O(1), so that execution efficiency of the SQL statement is improved.

In addition, similar conversion may also be performed on another clause of non-IN subquery (no more examples are listed herein, also applicable to: operators such as <op>SOME, <op>ANY, <op>ALL, LIKE, and BETWEEN . . . AND, also applicable to operators such as =, >, >=, <, and <=, and also applicable to operators such as IN, NOT IN, EXISTS, and NOT EXISTS. For example, it is assumed that the SQL statement is as follows (uk represents a unique key):

SELECT * FROM t1
WHERE uk>SOME (SELECT k2_2 FROM t2 WHERE k2_2>2);

the WHERE clause may be converted as:
uk>Min(3,4); and
then is further deformed as:
uk>3;

namely, the initial SQL statement is deformed as (this optimization is applicable to use of range scanning on an index to accelerate a query speed):

SELECT * FROM t1
WHERE uk>3.

To reduce resources, in some embodiments of this application, in a process of executing the uncorrelated subquery statement, if the number of rows (namely, the number of tuples) of the obtained execution result set is greater than the preset threshold, execution of the uncorrelated subquery statement may be stopped, and an optimization process of the uncorrelated subquery is ended, and otherwise, execution of the uncorrelated subquery statement is continued. That is, the step "executing the uncorrelated subquery statement" may include:

executing the uncorrelated subquery statement, and obtaining a number of rows of a current execution result set in real time in an execution process;

determining whether the number of rows of the current execution result set is greater than the preset threshold;

if the number of rows of the current execution result set is greater than the preset threshold, stopping execution of the uncorrelated subquery statement, and ending the optimization process of the uncorrelated subquery; and if the number of rows of the current execution result set is not greater than the preset threshold, continuing execution of the uncorrelated subquery statement, and returning to execution of step "obtaining a number of rows of a current execution result set in real time in an execution process", until execution of the uncorrelated subquery statement is completed.

In this case, the step "rewriting the target clause according to an execution result set of the uncorrelated subquery statement" may include: rewriting the target clause according to the execution result set of the uncorrelated subquery statement when execution of the uncorrelated subquery statement is completed.

The preset threshold is the foregoing sentinel value Kmax, and in the process of executing the uncorrelated subquery, a counting operation may be performed on obtained tuples (that is, obtaining the number of rows of the current execution result set). If the number of obtained tuples exceeds the sentinel value Kmax, execution of the subquery is stopped, and the optimization process of the uncorrelated subquery is ended.

After the uncorrelated subquery statement is eliminated, the optimization method provided in this embodiment may further include: performing corresponding logic optimization on the rewritten target clause. For example, when the rewritten target clause includes a constant equation or inequality, an expression of the rewritten target clause may be optimized according to the constant equation or inequality included in the rewritten target clause. The constant equation or inequality may be an equation or inequality including one or more constants therein. That is, the step "performing corresponding logic optimization on the rewritten target clause" may include:

when the rewritten target clause includes a constant equation or inequality, optimizing an expression of the rewritten target clause according to the constant equation or inequality included in the rewritten target clause.

For example, using an SQL statement as an example, it is assumed that the SQL statement is as follows (uk represents a unique key):

SELECT * FROM t1, t3
WHERE t1.uk IN (SELECT k2_2 FROM t2 WHERE k2_2>3)
AND t1.uk=t3.uk;

according to the execution result of the uncorrelated subquery statement "SELECT k2_2 FROM t2 WHERE k2_2>3", the WHERE clause may be changed as:

WHERE t1.uk=4
AND t1.uk=t3.uk;

in this way, the original SQL statement becomes:
SELECT * FROM t1, t3
WHERE t1.uk=4

AND t1.uk=t3.uk.

Because the WHERE clause on which uncorrelated subquery optimization is performed includes a constant equation, further logic optimization may be performed on the WHERE clause according to the constant equation, to obtain the optimized SQL statement:

SELECT * FROM t1, t3
WHERE t1.uk=4
AND t3.uk=4.

In this way, a join operation on Tables t1 and t3 becomes first separately performing index scanning once on the two tables, and then each having a tuple participating in the join operation. Therefore, time complexity of join becomes O(1), thereby greatly improving the join efficiency and statement execution efficiency.

As can be learned from the above, in the uncorrelated subquery optimization solution provided in this embodiment of this application, the uncorrelated subquery statement may be pre-executed before a statement execution phase, for example, in a logic optimization phase, and the target clause in which the uncorrelated subquery statement is located is rewritten according to the execution result, to eliminate the uncorrelated subquery. In this way, query and access related to any uncorrelated subquery statement do not need to be performed in a subsequent statement execution phase, so that computing resources are reduced, execution time of the database query statement is reduced, and the execution efficiency of the database query statement having the uncorrelated subquery is improved.

When uncorrelated subquery optimization is performed on the database query statement using a semi join optimization manner, viewing from a statement execution result, although the subquery is eliminated, the join operation exists, and in the period in which the executor executes the statement, the table specified by the subquery still needs to be accessed for a plurality of times. Consequently, the execution efficiency of the database query statement is not high, and a relatively large amount of time is spent in joining. If the query involves a large data volume, access to the table for a plurality of times also causes a large performance loss.

For example, a semi join optimization manner is described by using MySQL as an example. Referring to FIG. 1C, viewing from an execution result in FIG. 1C, although the subquery is eliminated, the join operation exists. That the id values are all 1 indicates that they are on a same level, namely, the subquery does not exist. A display result of a "SHOW WARNINGS" command indicates that the uncorrelated subquery is optimized into a semi join. During execution of the executor, Table t2 specified by the subquery still needs to be accessed for a plurality of times. In this way, the execution efficiency of the SQL statement is not high, and time spent in joining is O(n*m). If the query involves a large data volume, access to the Table t2 for a plurality of times consumes a large number of computing resources, and causes a large performance loss.

However, in the uncorrelated subquery optimization manner provided in this embodiment of this application, the uncorrelated subquery statement may be pre-executed, and the target clause in which the uncorrelated subquery statement is located is rewritten according to an execution result, to eliminate the uncorrelated subquery. Compared with the semi join optimization manner, the optimization manner in this embodiment can avoid access, for a plurality of times, to a subquery specified table in the statement execution phase, reduce the computing resources and statement execution time (specifically reducing time of a join operation on the subquery and the parent query), and improve the statement execution efficiency.

When the uncorrelated subquery optimization is performed on the database query statement in a materialized optimization manner, viewing from the statement execution result, the subquery is not eliminated, and is just materialized into a temporary table, and a join operation exists. During execution of the executor, the materialized temporary table of the table specified by the subquery still needs to be accessed for a plurality of times. A relatively large amount of time is spent in joining. In this way, the execution efficiency of the statement is not high. If the query involves a large data volume, the temporary table needs to be accessed for a plurality of times, consuming a large number of computing resources, and causing a large performance loss. For example, referring to FIG. 1D, the materialized optimization manner is described using MySQL as an example. Referring to FIG. 1D, viewing from the execution result in FIG. 1D, the query is not eliminated, and is just materialized into a temporary table. Then a semi join operation is performed on the materialized temporary table <subquery2> and Table t1. During execution of the executor, the materialized temporary table of Table t2 specified by the subquery still needs to be accessed for a plurality of times. Time spent in joining is O(n*m). In this way, the execution efficiency of the SQL statement is not high. If the query involves a large data volume, the temporary table needs to be accessed for a plurality of times, causing a large performance loss.

However, in the uncorrelated subquery optimization manner provided in this embodiment of this application, the uncorrelated subquery statement may be pre-executed, and the target clause in which the uncorrelated subquery statement is located is rewritten according to an execution result, to eliminate the uncorrelated subquery. Compared with the materialized optimization manner, the optimization manner in this embodiment can avoid access, for a plurality of times, to a temporary table after a subquery specified table is materialized in the statement execution phase, reduce the computing resources and statement execution time (specifically reducing time of a join operation on the subquery and the parent query), and improve the statement execution efficiency.

According to the method described in the foregoing embodiment, the following further provides detailed descriptions by using examples.

In this embodiment of this application, an uncorrelated subquery optimization method provided in this embodiment of this application is described by using an example in which the uncorrelated subquery optimization apparatus is integrated in a computing device, such as a server, and the database query statement is an SQL statement.

Figure 2A:
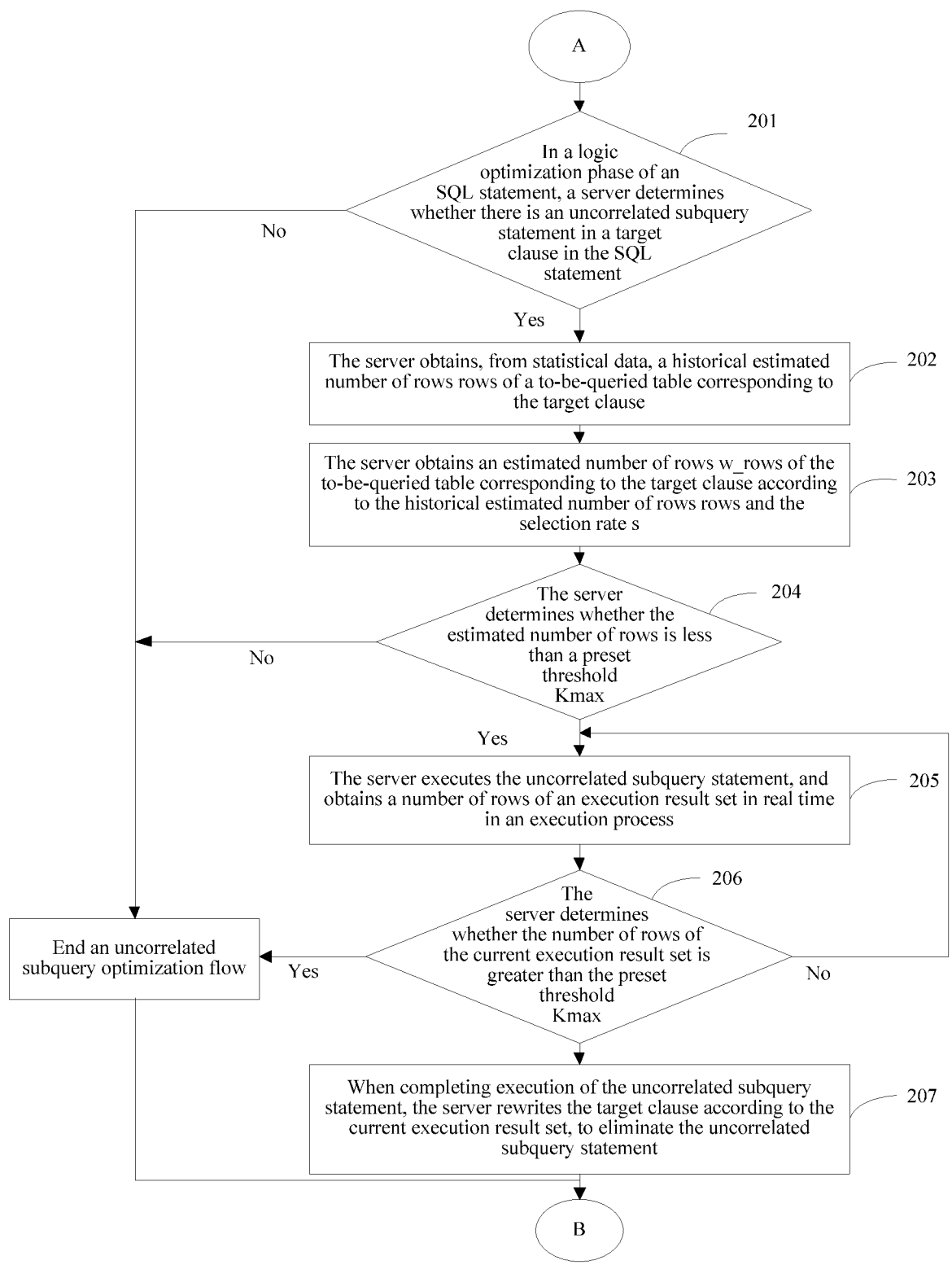
FIG. 2A is another schematic flowchart of an uncorrelated subquery optimization method according to an embodiment of this application.

As shown in FIG. 2A, a specific flow of an uncorrelated subquery optimization method may be as follows:

Step 201: In a logic optimization phase of an SQL statement, a server determines whether there is an uncorrelated subquery statement in a target clause in the SQL statement; if yes, perform step 202, and otherwise, end an uncorrelated subquery optimization flow.

The target clause may be a clause in which a subquery may occur, such as a WHERE clause, a FROM clause, or a JOIN/ON clause.

Step 202: The server obtains, from statistical data, a historical estimated number of rows rows of a to-be-queried table corresponding to the target clause.

Step 203: The server obtains an estimated number of rows w_rows of the to-be-queried table corresponding to the target clause according to the historical estimated number of rows rows and the selection rate s.

For example, the estimated number of rows of the execution result set corresponding to the target clause may be calculated by using a formula w_rows=rows*s.

For example, the estimated number of rows of the execution result set corresponding to the WHERE conditional clause may be calculated, and this process is the same as a conventional process of calculating the actual number of rows. If there is no WHERE condition in the uncorrelated subquery clause, the selection rate is 1, namely, equivalent to w_rows is equal to rows.

Step 204: The server determines whether the estimated number of rows is less than a preset threshold Kmax, and if yes, executes step 205, and if not, end the uncorrelated subquery optimization flow.

The preset threshold Kmax indicates the size of a result set of an uncorrelated subquery supported by the optimization method provided in this embodiment of this application. Kmax is a system/session parameter, and may be set according to actual requirements. In addition, Kmax may further be dynamically adjusted. For example, a default value is 2000, and a maximum value is 20000 (may be defined by a user), or the like.

Step 205: The server executes the uncorrelated subquery statement, and obtains a number of rows of an execution result set in real time in an execution process.

Step 206: The server determines whether the number of rows of the current execution result set is greater than the preset threshold Kmax, and if not, returns to step 205 to continue execution of the uncorrelated subquery statement, and if yes, stops execution of the uncorrelated subquery statement, and ends the uncorrelated subquery optimization flow.

For example, in the process of executing the uncorrelated subquery, a counting operation is performed on obtained tuples. If the number of obtained tuples exceeds the sentinel value Kmax, execution of the subquery is stopped, and the flow is ended. In a conventional optimization manner, an executor is not invoked in the optimization phase to obtain a query result. In this embodiment of this application, the executor can be invoked in the optimization phase, and an execution result of an uncorrelated subquery has been obtained in advance.

w_rows>Kmax means that the number of tuples of the uncorrelated subquery exceeds the sentinel value Kmax (namely, the uncorrelated subquery is a big table), and the optimization method of this embodiment of this application is not used any more, and this optimization method is exited. A conventional optimization manner can be used.

Step 207: When completing execution of the uncorrelated subquery statement, the server rewrites the target clause according to the current execution result set, to eliminate the uncorrelated subquery statement.

For example, the uncorrelated subquery statement in the expression of the target clause may be directly replaced with an execution result to eliminate the uncorrelated subquery.

For another example, after the uncorrelated subquery statement in the expression of the target clause is replaced with the execution result, the replaced expression may further be accordingly simplified and deformed according to an operator in the target clause. Specifically, after the uncorrelated subquery statement in the expression of the target clause is replaced with the execution result set, the replaced expression is accordingly deformed and optimized according to an operator in the target clause.

For example, the SQL statement is as follows:
SELECT * FROM t1
WHERE uk>SOME (SELECT k2_2 FROM t2 WHERE k2_2>2);
the WHERE statement may be converted as:
uk>Min(5,6); and
then is further deformed as:
uk>5;
namely, the initial SQL statement may be deformed as (this optimization is applicable to use of range scanning on an index to accelerate a query speed):
SELECT * FROM t1
WHERE uk>5.

In some embodiments of this application, after the uncorrelated subquery statement is eliminated, corresponding logic optimization may be performed on the SQL statement on which uncorrelated subquery optimization is performed. For example, when the uncorrelated subquery is changed as a constant equation or inequality, other expressions may be further optimized. After executed in the optimization phase, the uncorrelated subquery may be used to simplify the expression in the WHERE clause, and this provides possibility of further optimization for logic optimization.

For example, the query statement is as follows:
SELECT * FROM t1, t3
WHERE t1.uk IN (SELECT k2_2 FROM t2 WHERE k2_2>3)
AND t1.uk=t3.uk.

Regarding the uncorrelated subquery optimization, the foregoing statement may be deformed as
SELECT * FROM t1, t3
WHERE t1.uk=5
AND t1.uk=t3.uk.

Then, in subsequent logic optimization, the statement may be further deformed as:
SELECT * FROM t1, t3
WHERE t1.uk=5
AND t3.uk=5.

As can be learned from the foregoing statement, a join operation on Tables t1 and t3 becomes first separately performing index scanning once on the two tables, and then each having a tuple participating in the join operation. Therefore, time complexity of join becomes O(1), thereby greatly improving the join efficiency.

Figure 2B:
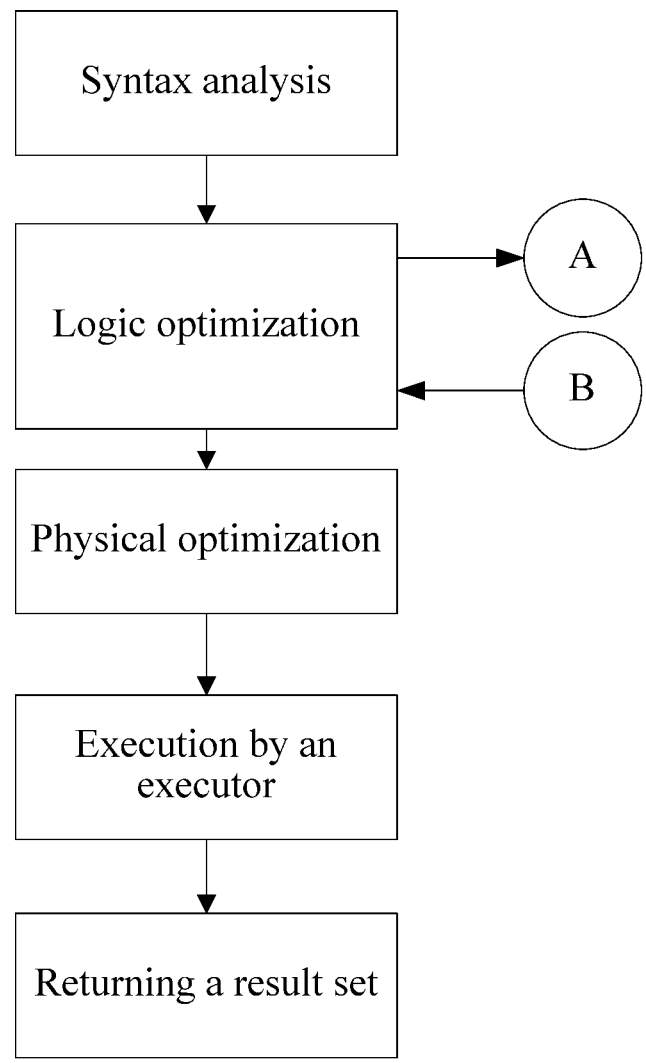
FIG. 2B is a schematic flowchart of SQL statement processing according to an embodiment of this application.

The uncorrelated subquery optimization manner provided in this embodiment may be executed in the logic optimization phase. Referring to FIG. 2B in combination with FIG. 2A, after syntax analysis is performed on a statement, the logic optimization phase can be entered. In the logic optimization phase, the uncorrelated subquery optimization may be performed in the optimization manner provided in this embodiment of this application. After the uncorrelated subquery optimization is performed (for example, after the uncorrelated subquery optimization is exited, namely, after the uncorrelated subquery optimization flow is ended, or after the uncorrelated subquery is eliminated), corresponding logic optimization is continued on the statement. After the logic optimization is completed, physical optimization may be performed on the statement. After the physical optimization is completed, the executor may be invoked to execute the optimized statement, and a result set is finally returned.

As can be learned from the above, in this embodiment of this application, whether there is an uncorrelated subquery statement in a target clause in a database query statement is determined; if yes, an estimated number of rows of an execution result set corresponding to the target clause is obtained; the uncorrelated subquery statement is executed to obtain an execution result set when the estimated number of rows is less than a preset threshold; and the target clause is rewritten according to the execution result set, to eliminate the uncorrelated subquery statement. In this solution, the uncorrelated subquery statement may be pre-executed before a statement execution phase, for example, in a logic optimization phase, and the target clause in which the uncorrelated subquery statement is located is rewritten according to the execution result, to eliminate the uncorrelated subquery. In this way, query and access related to any uncorrelated subquery statement do not need to be performed in a subsequent statement execution phase, so that computing resources and execution time of the database query statement are reduced, and the execution efficiency of the database query statement having the uncorrelated subquery is improved.

In addition, when the execution result is used as a constant clause in the SQL statement, the execution result can participate in a logic optimization sub-phase of another type, and can bring more possibilities of optimization for developing other types of optimization by the SQL statement, thereby further improving the statement execution efficiency. For example, as a clause constant in DQL/DML, the execution result can participate in an optimization process of the WHERE/JOIN-ON clause, namely, further provide new optimization possibilities for optimization of the WHERE clause.

Figure 3A:
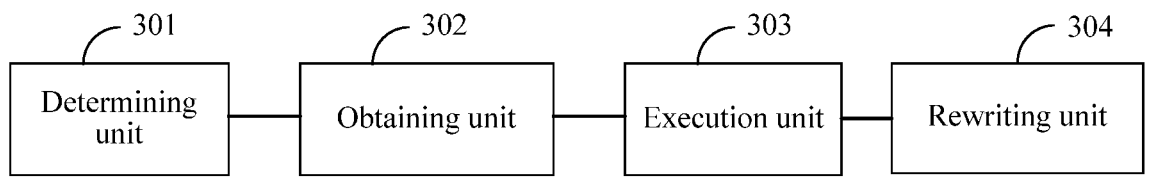
FIG. 3A is a first schematic structural diagram of an uncorrelated subquery optimization apparatus according to an embodiment of this application.

To better implement the foregoing method, an embodiment of this application further provides an uncorrelated subquery optimization apparatus. As shown in FIG. 3A, the uncorrelated subquery optimization apparatus includes: a determining unit 301, an obtaining unit 302, an execution unit 303, and a rewriting unit 304.

The determining unit 301 is configured to determine whether there is an uncorrelated subquery statement in a target clause in a database query statement.

Specifically, the determining unit 301 may determine whether there is an uncorrelated subquery statement in the target clause in the database query statement in a logic optimization phase of the database query statement.

The database query statement may be implemented by a plurality of languages, for example, an SQL or another type of language. The SQL may further include DQL, DML, and other languages.

In this embodiment, a subquery is nesting a query lower-layer program module in a common computer language such as a database query language. When a query is a subpart of another query, the query may be referred to as a subquery. The subquery is a query nested in a query, and this subquery may also be referred to as a nested query.

The obtaining unit 302 is configured to: when the determining unit 301 determines that there is an uncorrelated subquery statement, obtain an estimated number of rows of an execution result set corresponding to the target clause.

The execution result set corresponding to the target clause is a result set obtained by executing the target clause. The estimated number of rows is an estimated cardinality of an execution plan corresponding to the target clause, and may be an estimated number of rows that is returned from the data table result set or index.

In this embodiment, the estimated number of rows of the execution result set corresponding to the target clause such as the conditional clause may be obtained based on the historical estimated number of rows and the selection rate of the table. For example, the obtaining unit 302 may be specifically configured to: obtain a historical estimated number of rows of a to-be-queried table corresponding to the target clause; obtain a corresponding selection rate according to an expression of the target clause; obtain an estimated number of rows of the to-be-queried table corresponding to the target clause according to the historical estimated number of rows and the selection rate; and use the estimated number of rows of the to-be-queried table corresponding to the target clause as the estimated number of rows of the execution result set corresponding to the target clause.

For example, the estimated number of rows of the execution result set corresponding to the target clause may be calculated by using a formula $w\_rows=rows*s$.

The execution unit 303 is configured to execute the uncorrelated subquery statement when the estimated number of rows is less than a preset threshold.

The preset threshold (Kmax) is a sentinel value, which is a positive integer, and indicates the size of a result set of an uncorrelated subquery supported by the optimization method provided in this embodiment of this application. The preset threshold is a system/session parameter, and may be set according to actual requirements. In addition, the preset threshold may further be dynamically adjusted. For example, a default value is 2000, and a maximum value is 20000 (may be defined by a user), or the like.

To reduce resources, in some embodiments of this application, in a process of executing the uncorrelated subquery statement, if the number of rows (namely, the number of tuples) of the obtained execution result set is greater than the preset threshold, execution of the uncorrelated subquery statement may be stopped, and an optimization process of the uncorrelated subquery is ended, and otherwise, execution of the uncorrelated subquery statement is continued. Namely, the execution unit 303 may be specifically configured to:

execute the uncorrelated subquery statement, and obtain a number of rows of a current execution result set in real time in an execution process;

determine whether the number of rows of the current execution result set is greater than the preset threshold;

if the number of rows of the current execution result set is not greater than the preset threshold, continue execution of the uncorrelated subquery statement, and return to the step of obtaining a number of rows of a current execution result set in real time, until execution of the uncorrelated subquery statement is completed; and if the number of rows of the current execution result set is greater than the preset threshold, stop execution of the uncorrelated subquery statement, and end optimization of the uncorrelated subquery.

The rewriting unit 304 is configured to rewrite the target clause according to an execution result set of the uncorrelated subquery statement, to eliminate the uncorrelated subquery statement.

For example, the rewriting unit 304 may be configured to directly replace the uncorrelated subquery statement in the expression of the target clause with an execution result to eliminate the uncorrelated subquery.

Figure 3B:
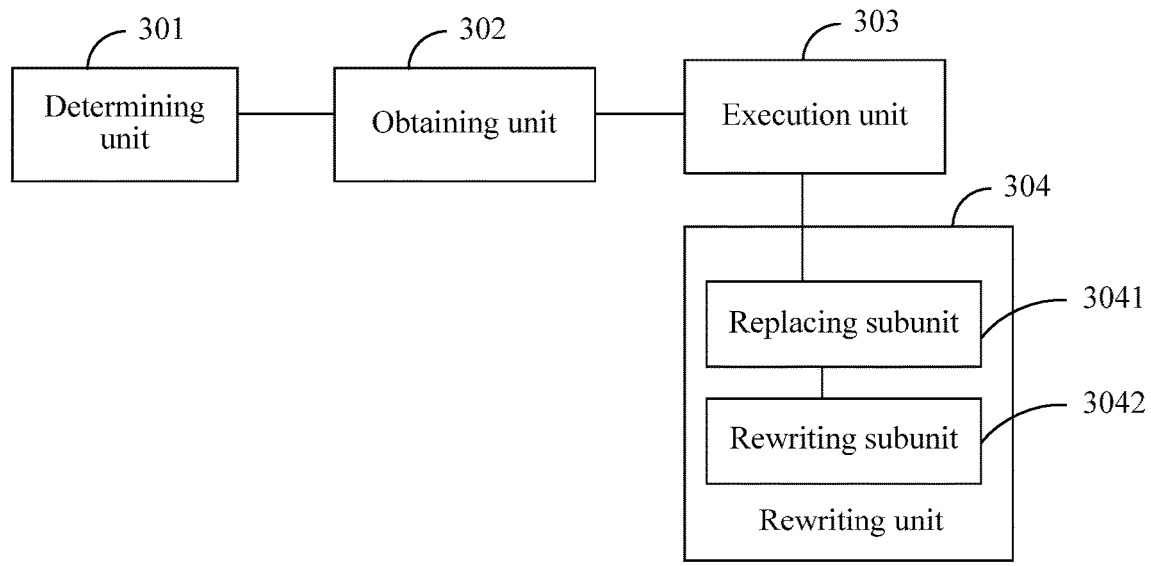
FIG. 3B is a second schematic structural diagram of an uncorrelated subquery optimization apparatus according to an embodiment of this application.

For another example, after the uncorrelated subquery statement in the expression of the target clause is replaced with the execution result, the replaced expression may further be accordingly simplified and deformed according to an operator in the target clause, to perform further optimization. Referring to FIG. 3B, the rewriting unit 304 may further include:

a replacing subunit 3041, configured to replace the uncorrelated subquery statement in an expression of the target clause with the execution result set of the uncorrelated subquery statement; and a rewriting subunit 3042, configured to perform corresponding deformation or transformation and optimization on the replaced expression according to an operator in the target clause.

Figure 3C:
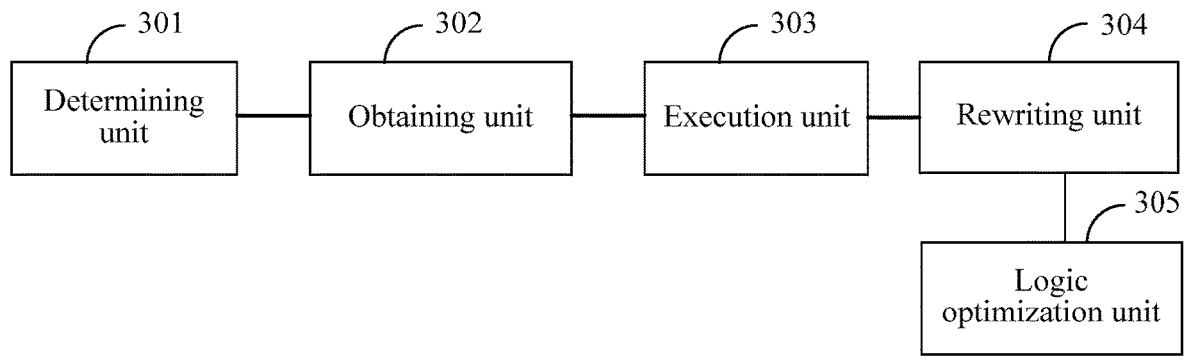
FIG. 3C is a third schematic structural diagram of an uncorrelated subquery optimization apparatus according to an embodiment of this application.

Referring to FIG. 3C, the optimization apparatus of this apparatus may further include: a logic optimization unit 305.

The logic optimization unit 305 may be configured to perform corresponding logic optimization on the rewritten target clause after the rewriting unit 304 eliminates the uncorrelated subquery statement.

For example, the logic optimization unit 305 may be configured to: when the rewritten target clause includes a constant equation or inequality, optimize an expression of the rewritten target clause according to the constant equation or inequality included in the rewritten target clause after the rewriting unit 304 eliminates the uncorrelated subquery statement.

During specific implementation, the foregoing units may be implemented as independent entities, or may be combined arbitrarily, or may be implemented as a same entity or several entities. For specific implementation of the foregoing units, refer to the foregoing method embodiments. Details are not described herein again.

The uncorrelated subquery optimization apparatus may be specifically integrated in a computing device such as a server. The server may be a database server.

As can be learned from the above, in this embodiment of this application, the optimization apparatus determines, by using a determining unit 301, whether there is an uncorrelated subquery statement in a target clause in a database query statement; if yes, the obtaining unit 302 obtains an estimated number of rows of an execution result set corresponding to the target clause; the execution unit 303 executes the uncorrelated subquery statement to obtain an execution result set when the estimated number of rows is less than a preset threshold; and the rewriting unit 304 rewrites the target clause according to the execution result set, to eliminate the uncorrelated subquery statement. In this solution, the uncorrelated subquery statement may be pre-executed before a statement execution phase, for example, in a logic optimization phase, and the target clause in which the uncorrelated subquery statement is located is rewritten according to the execution result, to eliminate the uncorrelated subquery. In this way, query and access related to any uncorrelated subquery statement do not need to be performed in a subsequent statement execution phase, so that computing resources and execution time of the database query statement are reduced, and the execution efficiency of the database query statement having the uncorrelated subquery is improved.

Figure 4:
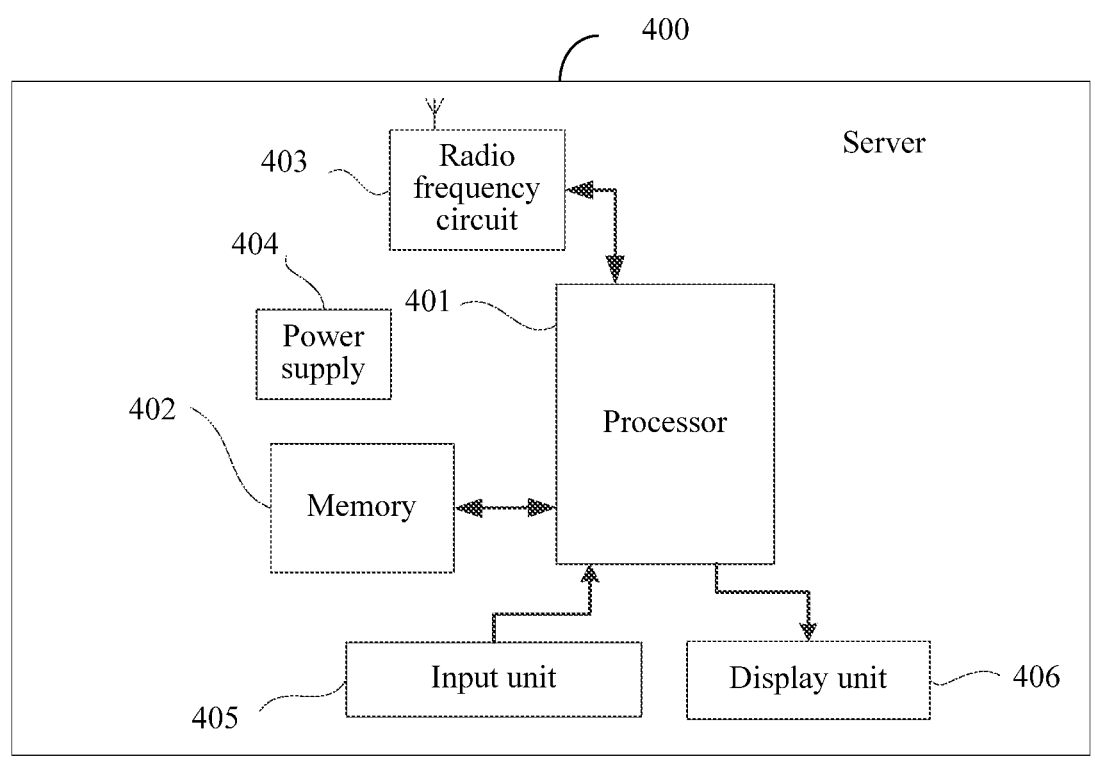
FIG. 4 is a schematic structural diagram of a server according to an embodiment of this application.

Corresponding, an embodiment of this application further provides a computing device, such as a server. FIG. 4 shows a schematic structural diagram of the server involved in this embodiment of this application. Specifically, the server 400 may include components such as a processor 401 including one or more processing cores, a memory 402 including one or more computer readable storage media, a radio frequency (RF) circuit 403, a power supply 404, an input unit 405, and a display unit 406. A person skilled in the art may understand that the server structure shown in FIG. 4 does not constitute a limit to the server. The server may include more or fewer parts than those shown in the figure, may combine some parts, or may have different part arrangements.

The processor 401 is a control center of the server, and is connected to various parts of the entire server by using various interfaces and lines. By running or executing a software program and/or module stored in the memory 402, and invoking data stored in the memory 402, the processor 401 executes various functions of the server and performs data processing, thereby monitoring the entire server. In some embodiments of this application, the processor 401 may include one or more processor cores. The processor 401 may integrate an application processor and a modem processor. The application processor mainly processes an operating system, a user interface, an application program, and the like. The modem processor mainly processes wireless communication. It may be understood that the foregoing modem may not be integrated into the processor 401, either.

The memory 402 may be configured to store a software program and module, namely, a machine readable instruction. The processor 401 runs the software program and module stored in the memory 402, to implement various functional applications and data processing. For example, the processor 401 may run the uncorrelated subquery optimization program stored in the memory 402, to implement the foregoing uncorrelated subquery optimization method.

The RF circuit 403 may be configured to receive and send a signal during information transmission and receiving. Especially, the RF circuit 403 sends, after receiving downlink information of a base station, the information to one or more processors 401 for processing, and sends involved uplink data to the base station.

The server further includes the power supply 404 (for example, a battery) that supplies power to each component. In some embodiments of this application, the power supply may be logically connected to the processor 401 by using a power supply management system, so that functions such as management of charging, discharging, and power consumption are implemented by using the power supply management system. The power supply 404 may further include one or more of a direct current or alternating current power supply, a re-charging system, a power failure detection circuit, a power supply converter or inverter, a power supply state indicator, and any other component.

The server may further include the input unit 405. The input unit 405 may be configured to receive entered numeric or character information and generate keyboard, mouse, joystick, optical, or trackball signal input related to user settings and function control.

The server may further include the display unit 406. The display unit 406 may be configured to display information entered by the user or information provided to the user, and graphical user interfaces of the server. The graphical user interfaces each may include an image, text, an icon, a video, or any combination thereof. The display unit 406 may include a display panel. Optionally, the display panel may be configured in a form of a liquid crystal display (LCD), an organic light-emitting diode (OLED), or the like.

Specifically, in this embodiment, the processor 401 of the server may load, according to the following instructions, executable files corresponding to processes of one or more application programs into the memory 402. The processor 401 runs the application programs stored in the memory 402, to implement various functions as follows:

determining whether there is an uncorrelated subquery statement in a target clause in a database query statement; if yes, obtaining an estimated number of rows of an execution result set corresponding to the target clause; executing the uncorrelated subquery statement when the estimated number of rows is less than a preset threshold; and rewriting the target clause according to an execution result set of the uncorrelated subquery statement, to eliminate the uncorrelated subquery statement.

The rewriting the target clause according to an execution result set of the uncorrelated subquery statement includes:

replacing the uncorrelated subquery statement in an expression of the target clause with the execution result set of the uncorrelated subquery statement; and performing corresponding deformation or transformation and optimization on the replaced expression according to an operator in the target clause.

The obtaining an estimated number of rows of an execution result set corresponding to the target clause includes:

obtaining a historical estimated number of rows of a to-be-queried table corresponding to the target clause;

obtaining a corresponding selection rate according to an expression of the target clause;

obtaining an estimated number of rows of the to-be-queried table corresponding to the target clause according to the historical estimated number of rows and the selection rate; and using the estimated number of rows of the to-be-queried table corresponding to the target clause as the estimated number of rows of the execution result set corresponding to the target clause.

Reference may be made to the detailed descriptions of the foregoing uncorrelated subquery optimization method embodiment for a specific operating step or process, and details are not described herein again.

A person of ordinary skill in the art may understand that all or some of the steps of the methods in the foregoing embodiments may be implemented by a program instructing relevant hardware. The program may be stored in a non-volatile computer readable storage medium. The storage medium may include: a read-only memory (ROM), a random access memory (RAM), a magnetic disk, an optical disc, or the like.

An uncorrelated subquery optimization method and apparatus provided in the embodiments of this application are described above in detail. Although the principles and implementations of this application are described by using specific embodiments in the specification, the foregoing descriptions of the embodiments are only intended to help understand the method and core idea of the method of this application. Meanwhile, a person of ordinary skill in the art may make modifications to the specific implementations and application range according to the idea of this application. In conclusion, the content of the specification should not be construed as a limitation to this application.

What is claimed is:

1. A method for optimizing an uncorrelated subquery, the method comprising:

determining, by a computer device comprising a memory storing instructions and a processor in communication with the memory, whether there is an uncorrelated subquery statement in a target clause in a database query statement; and in response to the determination that there is the uncorrelated subquery statement in the target clause in the database query statement:

obtaining, by the computer device, an estimated number of rows of an execution result set corresponding to the target clause by:

collecting, by the computer device, statistics on the estimated number of rows to form historical statistical data, obtaining, by the computer device, a historical estimated number of rows of a to-be-queried table corresponding to the target clause from the historical statistical data, obtaining, by the computer device, a selection rate according to an expression of the target clause, obtaining, by the computer device, an estimated number of rows of the to-be-queried table corresponding to the target clause according to the historical estimated number of rows and the selection rate, and using, by the computer device, the estimated number of rows of the to-be-queried table corresponding to the target clause as the estimated number of rows of the execution result set corresponding to the target clause;

determining, by the computer device, whether the estimated number of rows is less than a preset threshold; and in response to the determination that the estimated number of rows is less than a preset threshold:

executing, by the computer device, the uncorrelated subquery statement, and rewriting, by the computer device, the target clause according to an execution result set of the uncorrelated subquery statement, to eliminate the uncorrelated subquery statement, wherein rewriting the target clause according to the execution result set of the uncorrelated subquery statement comprises replacing, by the computer device, the uncorrelated subquery statement in the target clause with the execution result set of the uncorrelated subquery statement.

2. The method according to claim 1, wherein rewriting the target clause according to the execution result set of the uncorrelated subquery statement further comprises:

performing, by the computer device, transformation and optimization on a replaced expression according to an operator in the target clause.

3. The method according to claim 2, wherein the operator in the target clause comprises at least one of SOME, ANY, ALL, LIKE, BETWEEN, AND, =, >, >=, <, <=, NOT IN, EXISTS, or NOT EXISTS.

4. The method according to claim 1, wherein the obtaining the estimated number of rows of the to-be-queried table corresponding to the target clause according to the historical estimated number of rows and the selection rate comprises:

obtaining, by the computer device, the estimated number of rows of the to-be-queried table by calculating a product of the historical estimated number of rows multiplied by the selection rate.

5. The method according to claim 1, wherein the executing the uncorrelated subquery statement comprises:

executing, by the computer device, the uncorrelated subquery statement, and obtaining a number of rows of a current execution result set in real time in an execution process;

determining, by the computer device, whether the number of rows of the current execution result set is greater than the preset threshold; and in response to the determination that the number of rows of the current execution result set is not greater than the preset threshold, continuing, by the computer device, to execute the uncorrelated subquery statement, and returning to the step of obtaining the number of rows of the current execution result set in real time, until execution of the uncorrelated subquery statement is completed.

6. The method according to claim 1, wherein after the rewriting the target clause according to the execution result set of the uncorrelated subquery statement, to eliminate the uncorrelated subquery statement, the method further comprises:

when the rewritten target clause comprises a equation or inequality comprising a constant, optimizing, by the computer device, an expression of the rewritten target clause according to the equation or inequality comprised in the rewritten target clause.

7. An apparatus for optimizing an uncorrelated subquery, comprising:

a memory storing instructions; and a processor in communication with the memory, wherein, when the processor executes the instructions, the processor is configured to cause the apparatus to:

determine whether there is an uncorrelated subquery statement in a target clause in a database query statement;

in response to the determination that there is the uncorrelated subquery statement in the target clause in the database query statement:

obtain an estimated number of rows of an execution result set corresponding to the target clause by:

collecting statistics on the estimated number of rows to form historical statistical data, obtaining a historical estimated number of rows of a to-be-queried table corresponding to the target clause from the historical statistical data, obtaining a selection rate according to an expression of the target clause, obtaining an estimated number of rows of the to-be-queried table corresponding to the target clause according to the historical estimated number of rows and the selection rate, and using the estimated number of rows of the to-be-queried table corresponding to the target clause as the estimated number of rows of the execution result set corresponding to the target clause;

determine whether the estimated number of rows is less than a preset threshold; and in response to the determination that the estimated number of rows is less than a preset threshold:

execute the uncorrelated subquery statement when the estimated number of rows is less than a preset threshold, and rewrite the target clause according to an execution result set of the uncorrelated subquery statement, to eliminate the uncorrelated subquery statement, wherein, when the processor is configured to rewrite the target clause according to the execution result set of the uncorrelated subquery statement, the processor is configured to cause the apparatus to replace the uncorrelated subquery statement in the target clause with the execution result set of the uncorrelated subquery statement.

8. The apparatus according to claim 7, wherein, when the processor is configured to rewrite the target clause according to the execution result set of the uncorrelated subquery statement, the processor is further configured to cause the apparatus to:

perform transformation and optimization on a replaced expression according to an operator in the target clause.

9. The apparatus according to claim 8, wherein the operator in the target clause comprises at least one of SOME, ANY, ALL, LIKE, BETWEEN, AND, =, >, >=, <, <=, IN, NOT IN, EXISTS, or NOT EXISTS.

10. The apparatus according to claim 7, wherein, when the processor is configured to cause the apparatus to obtain the estimated number of rows of the to-be-queried table corresponding to the target clause according to the historical estimated number of rows and the selection rate, the processor is configured to cause the apparatus to:

obtain the estimated number of rows of the to-be-queried table by calculating a product of the historical estimated number of rows multiplied by the selection rate.

11. The apparatus according to claim 7, wherein, when the processor is configured to cause the apparatus to execute the uncorrelated subquery statement, the processor is configured to cause the apparatus to:

execute the uncorrelated subquery statement, and obtaining a number of rows of a current execution result set in real time in an execution process;

determine whether the number of rows of the current execution result set is greater than the preset threshold; and in response to the determination that the number of rows of the current execution result set is not greater than the preset threshold, continue to execute the uncorrelated subquery statement, and returning to the step of obtaining the number of rows of the current execution result set in real time, until execution of the uncorrelated subquery statement is completed.

12. The apparatus according to claim 7, wherein, when the processor executes the instructions, the processor is further configured to cause the apparatus to:

when the rewritten target clause comprises a equation or inequality comprising a constant, optimize an expression of the rewritten target clause according to the equation or inequality comprised in the rewritten target clause.

13. A non-transitory computer readable storage medium storing instructions, wherein the instructions, when executed by a processor, cause the processor to perform:

determining whether there is an uncorrelated subquery statement in a target clause in a database query statement; and in response to the determination that there is the uncorrelated subquery statement in the target clause in the database query statement:

obtaining an estimated number of rows of an execution result set corresponding to the target clause by:

collecting statistics on the estimated number of rows to form historical statistical data, obtaining a historical estimated number of rows of a to-be-queried table corresponding to the target clause from the historical statistical data, obtaining a selection rate according to an expression of the target clause, obtaining an estimated number of rows of the to-be-queried table corresponding to the target clause according to the historical estimated number of rows and the selection rate, and using the estimated number of rows of the to-be-queried table corresponding to the target clause as the estimated number of rows of the execution result set corresponding to the target clause;

determining whether the estimated number of rows is less than a preset threshold; and in response to the determination that the estimated number of rows is less than a preset threshold:

executing the uncorrelated subquery statement, and rewriting the target clause according to an execution result set of the uncorrelated subquery statement, to eliminate the uncorrelated subquery statement, wherein rewriting the target clause according to the execution result set of the uncorrelated subquery statement comprises replacing the uncorrelated subquery statement in the target clause with the execution result set of the uncorrelated subquery statement.

14. The non-transitory computer readable storage medium according to claim 13, wherein, when the instructions cause the processor to perform rewriting the target clause according to the execution result set of the uncorrelated subquery statement comprises:

performing transformation and optimization on a replaced expression according to an operator in the target clause.

15. The non-transitory computer readable storage medium according to claim 13, wherein, when the instructions cause the processor to perform obtaining the estimated number of rows of the to-be-queried table corresponding to the target clause according to the historical estimated number of rows and the selection rate, the instructions cause the processor to perform:

obtaining the estimated number of rows of the to-be-queried table by calculating a product of the historical estimated number of rows multiplied by the selection rate.

16. The non-transitory computer readable storage medium according to claim 13, wherein, when the instructions cause the processor to perform executing the uncorrelated subquery statement, the instructions cause the processor to perform:

executing the uncorrelated subquery statement, and obtaining a number of rows of a current execution result set in real time in an execution process;

determining whether the number of rows of the current execution result set is greater than the preset threshold; and in response to the determination that the number of rows of the current execution result set is not greater than the preset threshold, continuing to execute the uncorrelated subquery statement, and returning to the step of obtaining the number of rows of the current execution result set in real time, until execution of the uncorrelated subquery statement is completed.

17. The non-transitory computer readable storage medium according to claim 13, wherein, when the instructions are executed by the processor, the instructions cause the processor to perform:

when the rewritten target clause comprises a equation or inequality comprising a constant, optimizing an expression of the rewritten target clause according to the equation or inequality comprised in the rewritten target clause.

* * * * *

UNITED STATES PATENT AND TRADEMARK OFFICE
CERTIFICATE OF CORRECTION

PATENT NO. : 11,269,878 B2
APPLICATION NO. : 16/521895
DATED : March 8, 2022
INVENTOR(S) : Haixiang Li It is certified that error appears in the above-identified patent and that said Letters Patent is hereby corrected as shown below:

In the Claims

Column 18, Claim 3, Line 45, between "<=," and "NOT", insert --IN,--.

Signed and Sealed this
Tenth Day of May, 2022

Katherine Kelly Vidal
*Director of the United States Patent and Trademark Office*